(12) United States Patent  
Comon et al.

(10) Patent No.: US 9,145,832 B2  
(45) Date of Patent: Sep. 29, 2015

(54) GAS SHIELDING DEVICE

(71) Applicant: AIRCELLE, Gonfreville l'Orcher (FR)

(72) Inventors: Pierre Comon, Le Havre (FR); Nicolas Herve, La Frenaye (FR); Jean-Claude Rivoal, Gruchet-la-Valasse (FR)

(73) Assignee: AIRCELLE, Gonfreville L'Orcher (FR)

( * ) Notice: Subject to any disclaimer, the term of this patent is extended or adjusted under 35 U.S.C. 154(b) by 0 days.

(21) Appl. No.: 13/954,225

(22) Filed: Jul. 30, 2013

(65) Prior Publication Data

US 2013/0313229 A1 Nov. 28, 2013

Related U.S. Application Data

(63) Continuation of application No. PCT/FR2012/050192, filed on Jan. 30, 2012.

(30) Foreign Application Priority Data

Jan. 31, 2011 (FR) ...................................... 11 50705

(51) Int. Cl.
*B23K 9/173* (2006.01)
*F02C 7/24* (2006.01)
*B23K 9/16* (2006.01)
*B23K 9/32* (2006.01)

(Continued)

(52) U.S. Cl.
CPC ... *F02C 7/24* (2013.01); *B23K 9/16* (2013.01); *B23K 9/164* (2013.01); *B23K 9/325* (2013.01); *B23K 26/123* (2013.01); *B23K 26/147* (2013.01); *B23K 26/20* (2013.01); *B23K 35/38* (2013.01); *B23K 35/383* (2013.01); *B23P 6/00* (2013.01); *B23P 6/005* (2013.01); *B32B 15/04* (2013.01); *B32B 43/00* (2013.01); *B64F 5/0081* (2013.01); *F01D 5/005* (2013.01); *F02C 7/045* (2013.01); *F16B 5/01* (2013.01); *F16B 5/08* (2013.01); *B23K 2201/006* (2013.01); *B23K 2201/02* (2013.01); *B23K 2203/08* (2013.01); *B23K 2203/14* (2013.01); *B32B 2250/40* (2013.01); *B32B 2305/024* (2013.01); *B32B 2307/102* (2013.01); *B32B 2311/00* (2013.01); *B32B 2605/18* (2013.01); *Y02T 50/672* (2013.01); *Y10T 29/4957* (2015.01)

(58) Field of Classification Search
USPC .................................................. 219/74–76, 60
See application file for complete search history.

(56) References Cited

U.S. PATENT DOCUMENTS 2,856,510 A 10/1958 Jones et al.
3,125,666 A * 3/1964 Gorman .......................... 219/74

(Continued)

FOREIGN PATENT DOCUMENTS

JP 61289971 A 12/1986
JP 7172304 A 7/1995
JP 08197173 A * 8/1996

OTHER PUBLICATIONS

I PCT/FR2012/050192 International Search Report.

*Primary Examiner* — Dana Ross
*Assistant Examiner* — Renee L Miller
(74) *Attorney, Agent, or Firm* — Brinks Gilson & Lione

(57) ABSTRACT

A gas shielding device used during a welding step in a controlled atmosphere of a sound attenuation panel includes an inert gas injector to inject inert gas onto the panel and a housing to receive a welding torch. The inert gas injector comprises an inert gas diffuser mounted on the periphery of the housing for receiving the welding torch.

4 Claims, 3 Drawing Sheets

(51) Int. Cl.
*B23K 26/12* (2014.01)
*B23K 26/14* (2014.01)
*B23K 26/20* (2014.01)
*B23K 35/38* (2006.01)
*B23P 6/00* (2006.01)
*B32B 43/00* (2006.01)
*B64F 5/00* (2006.01)
*F01D 5/00* (2006.01)
*F02C 7/045* (2006.01)
*F16B 5/01* (2006.01)
*F16B 5/08* (2006.01)
*B32B 15/04* (2006.01)

(56) References Cited

U.S. PATENT DOCUMENTS

| | | | |
|---|---|---|---|
| 5,003,150 A | 3/1991 | Stricklen | |
| 5,388,753 A | 2/1995 | Bjorkman, Jr. | |
| 5,393,949 A * | 2/1995 | Stricklen | 219/74 |
| 5,980,174 A * | 11/1999 | Gallagher et al. | 411/55 |
| 2006/0076320 A1* | 4/2006 | Watanabe et al. | 219/75 |
| 2009/0236319 A1* | 9/2009 | Matz | 219/74 |

* cited by examiner

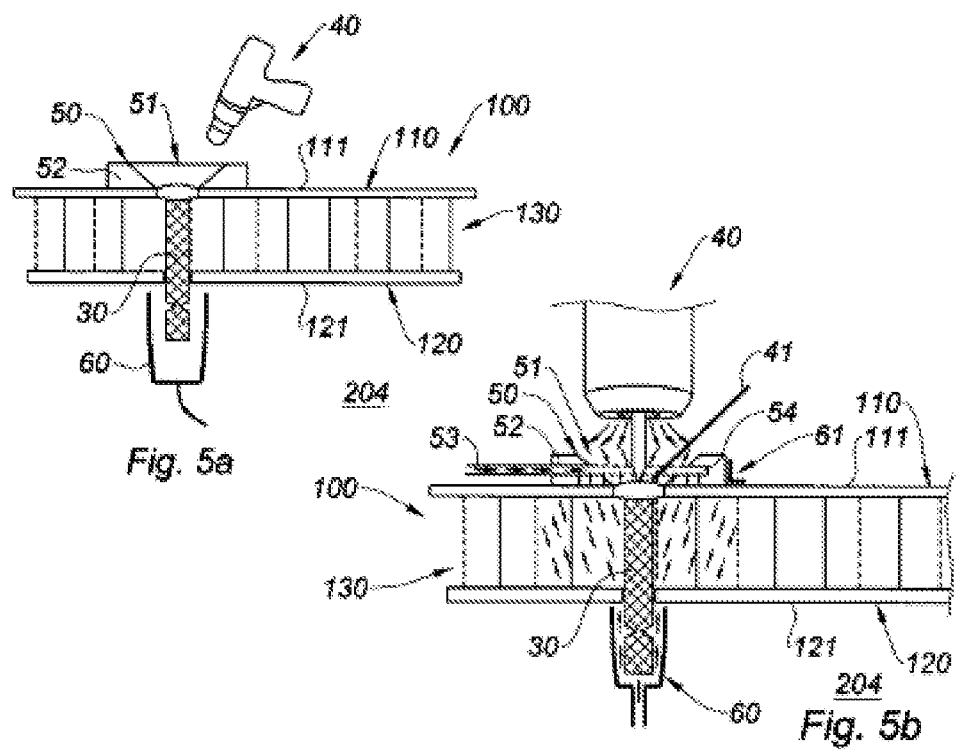
Fig. 5a
Fig. 5b
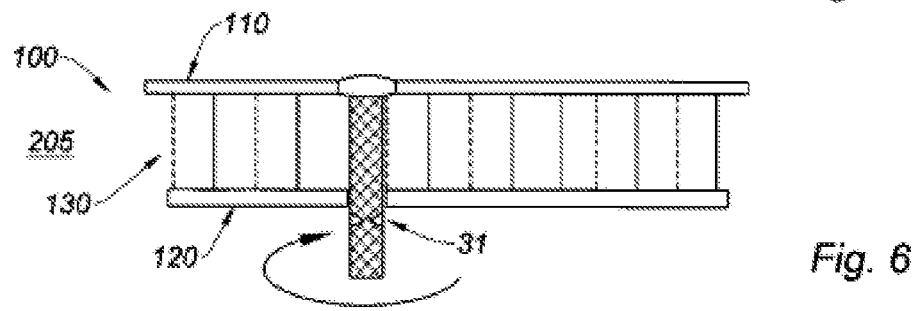
Fig. 6
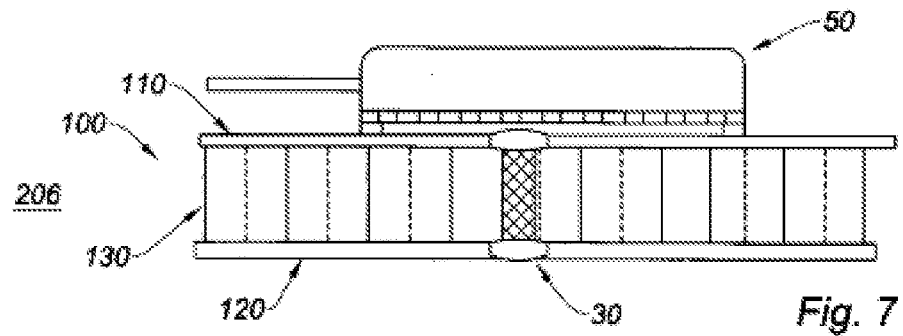
Fig. 7

GAS SHIELDING DEVICE

CROSS-REFERENCE TO RELATED APPLICATIONS

This application is a continuation of International Application No. PCT/FR2012/050192, filed on Jan. 30, 2012, which claims the benefit of FR 11/50705, filed on Jan. 31, 2011. The disclosures of the above applications are incorporated herein by reference.

FIELD

The present disclosure relates to a method for manufacturing a sound attenuation panel in particular for aeronautics, and a device for implementing the method.

BACKGROUND

The statements in this section merely provide background information related to the present disclosure and may not constitute prior art.

The use of sound attenuation panels e.g. in aircraft engine nacelles and of nacelle parts equipped with said panels to reduce noise emissions from turbojet engines is known in the state of the art.

These sound attenuation panels generally have a sandwich structure comprising a structuring skin, an alveolar structure of honeycomb type and a resistive layer generally formed by a perforated acoustic skin.

In some cases, the sound attenuation panels must be designed for installation in a hot zone of the nacelle of the aircraft turbojet engine, and in particular in the downstream part of this nacelle via which exhaust gases are expelled whose temperature is typically higher than 600° C.

The use of sound attenuation panels in this exhaust area allows a substantial reduction in noise emissions which lie in the high frequency range.

For these particular high temperature applications, use is generally made of sound attenuation panels whose structuring skin is formed by a metal sheet, the honeycomb structure is metallic and the resistive layer is a perforated metal sheet.

The metallic honeycomb structure is then joined by brazing (i.e. assembly of two materials using a filler metal having a melt temperature lower than that of the base metal) onto the structuring metallic sheet and the perforated metal sheet.

The use of metal alloys for all the elements forming this sandwich structure and the use of brazing for the joining thereof are particularly high-cost.

Yet such parts are often manufactured from relatively expensive metals or alloys, developed to withstand high-temperature environments whilst preserving necessary properties of strength.

The manufacturing thereof is therefore relatively costly.

Therefore, when one of these panels is damaged either during its assembly or on account of service conditions through thermal fatigue, corrosion, erosion or even impacting with other objects, it is desirable to repair this panel to avoid the expense of a new part.

Another possible deterioration of said panel which requires repair is deterioration of the junction interfaces between the structuring skin, the resistive layer and the honeycomb structure affecting the structural qualities of the panel.

However, assembly or repair operations of such deteriorations by welding or brazing are complex insofar as one of the skins of the sound panel has small-size orifices and the other is solid.

Repair methods are therefore known in which all or part of the skin of a sound panel and/or of the honeycomb structure are replaced. Such methods are costly.

In addition, associated assembly or repair operations are not easy insofar as there is a risk that the acoustic and structural qualities of the panel may be affected by these operations, such as deteriorated mechanical strength of the sandwich panel, even loss of acoustic absorption of the panel.

Also, assembly and repair operations such as welding or brazing have an effect on the metallurgical properties of the treated panel affecting the surface properties thereof.

Defects such as oxidization or cracking may therefore result from repair operations.

When located within the panels, these defects are difficult to remove.

SUMMARY

The present disclosure provides a method for repairing a sound attenuation panel adapted for installation in a hot zone, which reduces the risks of separation of panel skins from their honeycomb structure and provides protection against contamination of the treated panel.

Further, the present disclosure proposes a method for repairing a sound attenuation panel adapted for installation in a hot zone, which meets requirements relating to maintaining the acoustic and structural qualities of the repaired panel. Additionally, the method is relatively low-cost and simple to implement.

An alternative solution to gas shielding devices according to the present disclosure allows the implementation of the aforementioned repair methods and laminar diffusion of the shielding gas over parts to be welded.

For this purpose, the present disclosure proposes a method for repairing a sound attenuation panel comprising a structuring skin in metallic material, a resistive layer in metallic material and a honeycomb structure as acoustic absorption material directly added onto the structuring skin and the resistive layer, noteworthy in that it comprises at least one step in which at least one reinforcing pin is inserted into the thickness of said panel, and said pin is respectively secured to the structuring skin and the resistive layer.

According to other optional characteristics of this method of the present disclosure:
- said pin is respectively secured onto the resistive layer and structuring skin of the panel;
- the reinforcing pin is inserted transverse to the honeycomb structure and oriented perpendicular to the planes of the resistive layer and the structuring skin of the panel;
- the securing step of the reinforcing pin is a welding step in a controlled atmosphere perpendicular to and on the reverse side of the welded surfaces;
- at the welding step of the reinforcing pin onto the resistive layer, an inert gas diffusing device is placed on the resistive layer other than a welding torch and gas ejection nozzle on the other side of the panel on the structuring skin;
- gas of argon or helium type is diffused, or a mixture of both;
- prior to inserting the reinforcing pin, perforations are made on the resistive layer and structuring skin, these perforations being of shape and size matching those of the reinforcing pin;
- prior to inserting the reinforcing pin and following successively after the perforation step, a de-burring step is performed on the inner and outer surfaces of the resistive layer and structuring skin.

The present disclosure also proposes a sound attenuation panel obtained with the aforementioned repair method.

It further proposes an aircraft engine nacelle equipped with at least one sound panel such as aforementioned.

The present disclosure also proposes a gas shielding device used during a welding step of a sound attenuation panel in a controlled atmosphere, comprising means for injecting inert gas onto the said panel and means for receiving a welding torch, noteworthy in that the inert gas injecting means comprise an inert gas diffuser mounted on the periphery of the means for receiving the welding torch.

According to other optional characteristics of this device of the present disclosure:
- the device is adapted to cooperate with the welding torch and to allow welding perpendicular to and on the reverse side of the panel surfaces to be welded;
- the means for receiving the welding torch comprise a housing adapted to receive the welding torch and enable it to pass through a chamber of the device, and the diffuser comprises a ring mounted coaxially to the housing receiving the welding torch;
- the diffuser is configured to ensure the non-turbulent feeding of gas onto the surfaces of the panel to be welded;
- the diffuser is adapted to diffuse the gas indirectly onto the surfaces to be welded, the diffuser ring comprising gas outlet orifices on its periphery directed towards the concavity of the chamber;
- the device further comprises a honeycomb grating with through-orifices which is positioned facing the surfaces to be welded to allow welding through the device.

Further areas of applicability will become apparent from the description provided herein. It should be understood that the description and specific examples are intended for purposes of illustration only and are not intended to limit the scope of the present disclosure.

DRAWINGS

In order that the present disclosure may be well understood, there will now be described various forms thereof, given by way of example, reference being made to the accompanying drawings, in which:

FIGS. 2 to 7 illustrate different consecutive steps of the method for repairing the sound attenuation panel in FIG. 1 according to one form of the present disclosure;

Figure 1:
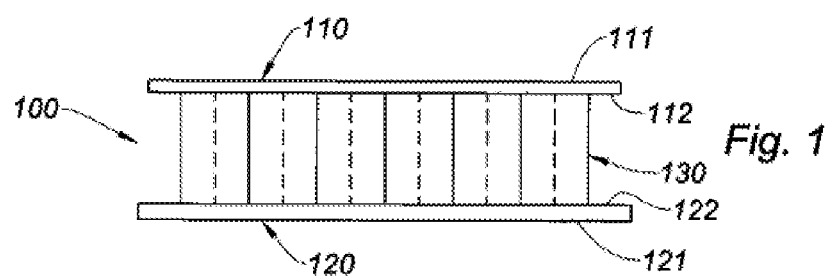
FIG. 1 is a schematic cross-sectional illustration of one form of a sound attenuation panel intended to be repaired using a method according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As can be seen in FIG. 1, a sound attenuation panel 100 adapted for repair using a method of the present disclosure, and on the side opposite the source of sound excitation, comprises a structuring skin 120 formed in sheet metal.

On this structuring skin 120 there is added an alveolar structure of honeycomb type 130 as acoustic absorption material known per se.

A resistive layer 110 formed of a perforated metal sheet or wire mesh or a combination of these two elements can be added onto the honeycomb structure 130 for encapsulation thereof between this resistive layer and the structuring skin 120.

In one non-limiting example, the perforations have an inner diameter of less than 1.5 mm.

The honeycomb structure 130 can be secured to the structuring skin 120 and to the resistive layer 110 using a brazing or welding process.

This sound attenuation panel 100 is adapted for use in a high temperature zone, in particular in an aircraft nacelle (in particular in the expulsion zone of the turbojet engine exhaust gases).

As indicated previously, the structuring skin 120 and the resistive layer 110 may be formed from metallic materials.

These materials can be chosen from among metals and/or metal alloys such as titanium, Inconel and all grades thereof.

The honeycomb structure 130 can be formed of metal materials, polymers, ceramics or composites that are commercially available.

In the particular case in which the sound attenuation panel 100 is intended to be installed in the high temperature zones of an aircraft nacelle, the material of the honeycomb structure 130 may withstand temperatures of up to 800° C.

The sound attenuation panel 100 when damaged can be repaired using a method 200 which is implemented as follows.

This panel 100 may be damaged in various manners, namely as non-limiting examples by abrasion, erosion, impact or corrosion.

The repair method comprises a series of successive steps which will be described with reference to FIGS. 2 to 7.

Figure 2:
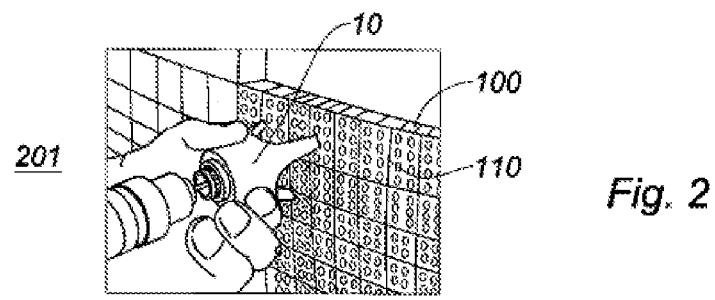

At a step 201 prior to the repair method illustrated in FIG. 2, perforations 113 are made (which can be seen in FIG. 3) on the resistive layer 110 using suitable tooling.

The position of these perforations 113 can be determined in relation to the sections of the sound attenuation panel 100 which are damaged.

The positions of these perforations 113, as non-limiting examples, can be determined after non-destructive inspection (e.g., Taptest, X-Ray radiography, Ultrasound Inspection type etc.) allowing the identification of non-brazed zones or of zones having another defect.

After this identification, a schematic of these perforations 113 is drafted following the centre-distances validated by tests and calculations.

They are therefore made directly above those sections whose undesirable parts have been removed by the perforation 113.

At a successive step, similar perforations 123 (which can be seen in FIG. 3) are made on the structuring skin 120 perpendicular to the perforations of the resistive layer 110.

The dimensions and in particular the diameter of these perforations are greater than those of the perforations 113 of the resistive layer 110.

This diameter is a function of the de-burring tool used at a subsequent step of the method which will be described with reference to FIG. 3.

Therefore the sound attenuation panel 100 is pierced either side of the honeycomb structure 130.

To obtain these perforations, one variant of form provides for an adapted drilling device comprising at least one drill bit whose shape and size are adapted for the desired perforations 113, 123.

This drill can be combined with a support 10 ensuring the stability thereof, namely a support 10 of tripod type comprising an adapted drill bush.

Once the perforations of the sound attenuation panel 100 have been made, at a following step 202 any excess material is removed that is still present on the structuring skin 120 and resistive layer 110 lying perpendicular to the perforations 113, 123 made.

This excess material may particularly correspond to burrs left after welding or brazing the structuring skin 120 and the resistive layer 110 onto the honeycomb structure 130, but also to burrs originating from the perforations 113, 123 that have just been made.

Therefore, at this step, the inner 112 and outer 111 surfaces of the resistive layer 110 and the inner surface 122 of the structuring skin 120 are de-burred so as to obtain a clean surface condition of the structuring skin 120 and resistive layer 110.

This de-burring can be carried using any known de-burring technique.

Advantageously, this de-burring allows the avoiding of any pollution during subsequent welding of the reinforcing pins; thereby preventing inclusions, improper joins, porosities, cracks, as non-limiting examples.

Figure 3:
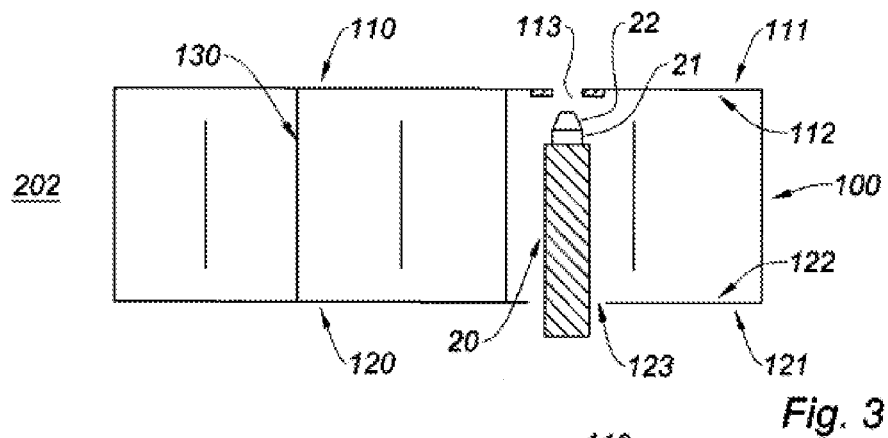

In one form, de-burring is performed by abrasion using a tool of adapted shape illustrated in FIG. 3.

This tool is in the form of a reamer 20 extended at its free end by a guide 21.

This guide 21 has one end 22 in the form of a truncated cone whose shape and dimensions are adapted to pass through the perforations made in the resistive layer 110.

Also, the reamer 20 is itself of identical shape and size to the reinforcing pins intended to be inserted in the thickness of the panel 100 perpendicular to the perforations 113, 123 as will be seen below with reference to FIG. 4.

At the following step 203, reinforcing pins 30 are inserted into the thickness of the sound attenuation panel 100, these reinforcing pins 30 extending in contact with the resistive layer 110 and structuring skin 120 and, more particularly, each reinforcing pin 30 comes to be inserted in the spaces left free by the perforations 113, 123 of the resistive layer 110 and structuring skin 120.

Therefore, each thereof has a shape and dimensions which match those of these perforations 113, 123.

These reinforcing pins are intended to reinforce the interfaces of the honeycomb structure 130 with the resistive layer 10 and structuring skin 120 respectively.

These pins will also reinforce the structural quality of the panel 100 by directly connecting together the metallic resistive layer 110 and structuring skin 120.

They will also take part in the elimination of interface defects between the honeycomb structure 130 and the skins 120, 110.

Figure 4:
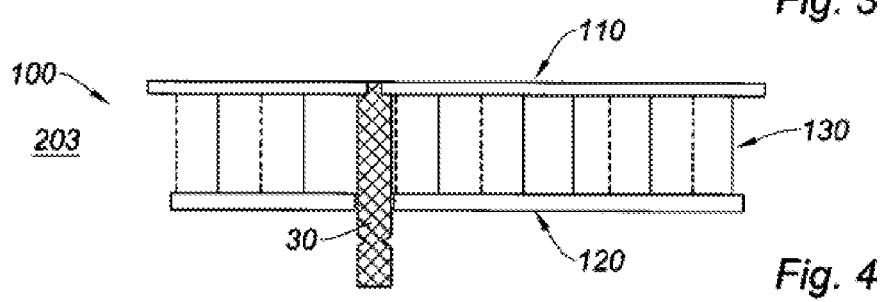

In one form illustrated in FIG. 4, these reinforcing pins 30 extend transverse to the honeycomb structure 130 and are oriented perpendicular to the planes of the resistive layer 110 and structuring skin 120 of the panel 100.

However, other orientations of the reinforcing pins 30 can be envisaged.

These reinforcing pins 30 are in metallic material.

They may also be in a material similar to the constituent material of the structuring skin 120 and resistive layer 110.

At the following step 204, each of the reinforcing pins 30 is respectively and successively secured onto the resistive layer 110 and structuring skin 120 of the panel 100.

This securing step 204 can be performed using any known welding or brazing process, offering the advantage of ensuring a continuous connection between each pin 30 and the constituent skins of the panel 100.

In one variant of form illustrated in FIGS. 5a and 5b, the welding of each reinforcing pin 30 onto the resistive layer 110 and structuring skin 120 of the panel 100 is performed using an arc welding process with non-consumable electrode of TIG welding type, the filler wire being illustrated by reference 41 in FIG. 5b.

However, other types of welding methods can be envisaged. As non-limiting examples, mention can be made of laser welding or resistance welding.

The welding process is well known to persons skilled in the art and will not be detailed in the remainder hereof, nor does the tooling used require description which is of welding torch type 40 as illustrated in FIGS. 5a and 5b.

It is recalled however that said welding torch 40 is used in a flow of gas or argon or helium type or a mixture of both.

Advantageously, the securing step 204 is performed in a controlled atmosphere perpendicular to and on the reverse side of the welded surfaces.

With reference to FIGS. 5a, 5b, 8 and 9, to carry out welding in a controlled atmosphere, an inert gas diffusion device 50 of trailing shield type is placed perpendicular to the pins 30 on the side of the outer surface 111 of the resistive layer 110.

The gas can be a shield gas of Argon or Helium type, or a mixture of both.

This device 50 is adapted to cooperate with the welding torch 40 and to allow welding perpendicular to and on the reverse side of the welded surfaces.

It is also intended to cooperate with an inert gas injection nozzle 60 placed on the opposite side of the panel 100, namely on the outer surface 121 of the structuring skin 120.

The inert gas diffusion device 50 allows the weld bead and heat-affected area of the welds between each pin 30 and the constituent skins of the panel 100 to be maintained under a sufficiently inert atmosphere to prevent the onset of cracks in particular.

This device 50 more specifically comprises a local diffusion chamber 52 equipped with means 53 for injecting fluid onto the treated panel 100.

This chamber 52 concentrates the diffusion of gas within an inert enclosure located on the perforations 113 of the resistive layer 110 that is larger than the enclosure offered by the nozzle associated with the welding torch 40, to prevent the onset of cracks.

This chamber 52 may be flexible and is therefore capable of adapting at least in part to the surface of the treated panel.

The chamber 52 comprises a housing adapted to receive the welding torch 40 allowing it to pass through the chamber 52 so as to bring the welding torch 40 close to the zone to be welded.

This housing is formed by a central through-orifice 51.

Figure 8:
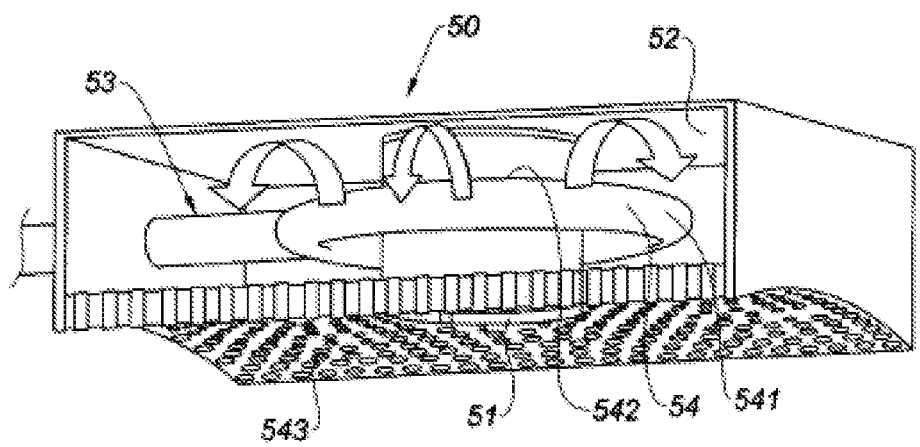
FIG. 8 is a perspective view of a gas shielding device implementing a welding step of the method in FIGS. 1 to 7.
Figure 9:
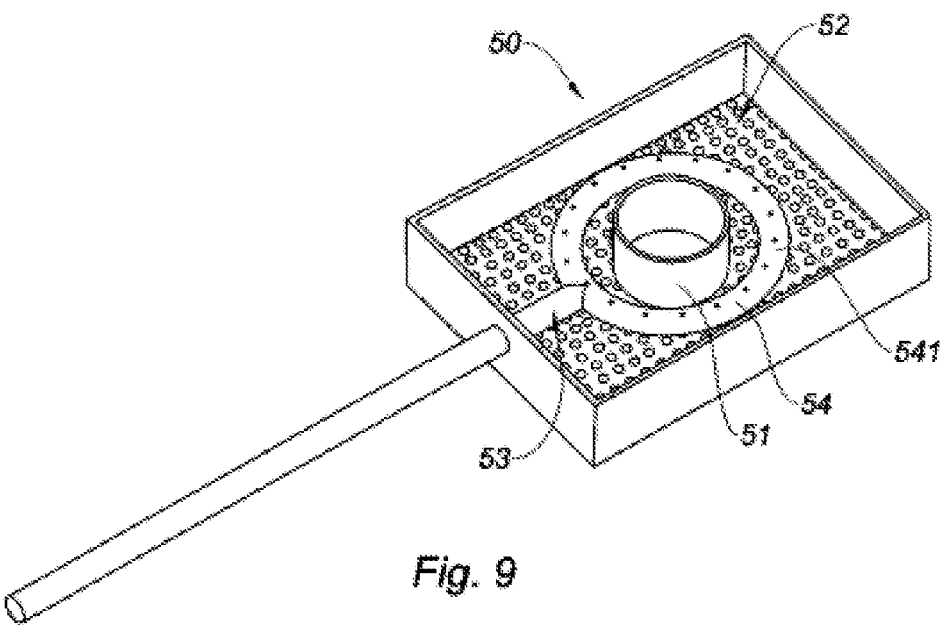
FIG. 9 is a perspective bird's eye view of the device in FIG. 8.

This central orifice may be tube-shaped as in FIGS. 8 and 9 or cone-shaped as in FIGS. 5a and 5b. Any shape of orifice can be adapted without departing from the scope of the present disclosure.

The gas injection means 53 comprise a feed end arranged on the outside of the chamber 52 and a gas dispensing end housed inside the chamber 52.

These injection means 53, at their dispensing end, comprise a diffuser 54 housed inside the chamber 52 i.e. an element intended to disperse and spread the incoming unidirectional gas flow throughout the chamber 52.

Advantageously, this diffuser 54 is a diffuser mounted on the periphery of the housing of the welding torch 40, configured to ensure a non-turbulent gas feed i.e. laminar diffusion thereof on the weld bead of each pin 30 and the corresponding constituent skins of the panel 100.

The term "mounted on the periphery" notably means that the diffuser 54 extends over at least part of the surround of the walls of the central orifice 51 forming a housing for the welding torch 40, or over all said surround as particularly illustrated in FIGS. 8 and 9.

It may be mounted on the outer or inner periphery of said orifice 51.

Therefore, with said device 50 it is possible to overcome the use of existing trailing shields whose gas injection means are necessarily placed behind the welding torch to ensure said laminar gas diffusion.

Advantageously, the diffuser 54 is adapted to diffuse the gas indirectly onto the parts to be welded.

This diffuser comprises a ring 541 mounted coaxially to the central orifice 51 receiving the welding torch 40, this ring 541 comprises gas outlet orifices 542 on its periphery directed towards the concavity of the chamber, opposite the parts to be welded.

With said orifices 542, the diffusion of inert gas is not directed towards the orifices of the skin of the panel 100 but opposite thereto, allowing laminar flow of the gas within the chamber 52.

To close the chamber 52, the device comprises a honeycomb grating 543 with through-orifices which is positioned facing the parts to be welded so as to perform welding through the device.

With regard to the inert gas injection nozzle 60 positioned on the side of the structuring skin 120, this is also adapted to act via pressure upon the reinforcing pins 30 at the time of their securing onto the resistive layer 110.

Therefore, as illustrated in FIG. 5b by arrows, an inert gas circulates either side of the weld but also inside the honeycomb structure 130, on the inner and outer surfaces of the resistive layer 110 and structuring skin 120, thereby advantageously limiting any onset of weld or brazing cracks.

The atmosphere in which welding takes place is controlled and problems related to contamination of the repaired panel 100 can be solved.

This offers the advantage of controlling the atmosphere in which welding is performed and, as previously mentioned, efficiently prevents any contamination of the panel of oxidation type or any onset of cracking.

Additionally, sealing means 61 can be arranged on the circumference of the chamber 52 to guarantee a certain degree of imperviousness of the chamber 11.

The seals may be commercially available gaskets.

It is also possible to use high temperature sealing tape or aluminium for local improvement of the seal.

At a subsequent step 205 illustrated in FIG. 6 when the reinforcing pin 30 is welded onto the resistive layer 110, a torque is applied to said pin 30 so that it breaks at one end corresponding to the structuring skin 120.

To facilitate such breaking, each reinforcing pin 30 comprises a narrowing 31 at a point in the length of the pin 30 corresponding to the thickness of the panel 100 so that, once the part of the pin 30 is broken, the end of the pin 30 comes to lie opposite the structuring skin 120 in the perforation 123 that has been made.

Since the reinforcing pin 30 now has dimensions adapted to those of the panel 100, at a subsequent step 206 the pin 30 is secured to the structuring skin 120 of the panel 100 using a welding process similar that of the preceding welding step 204 in a controlled atmosphere through the positioning of the gas diffusion device 50 arranged on the resistive layer 110 of the panel as illustrated in FIG. 7.

The method 200 for repairing a sound attenuation panel 100 according to the present disclosure can be completed by a step 207 to trim the welds on the outer surfaces 111, 121 of the resistive layer 110 and structuring skin 120.

Evidently the present disclosure is not limited to the forms of the method described above as examples, but on the contrary encompasses all possible variants.

What is claimed is:

1. A gas shielding device used during a welding step in a controlled atmosphere of a sound attenuation panel, comprising:
    a chamber;
    an inert gas injection device to inject inert gas onto said panel located within the chamber;
    a housing having an orifice for receiving a welding torch, the housing being located within the chamber; and
    a honeycomb grating located within the chamber with orifices open to the sound attenuation panel on one side and open to an atmosphere on an opposite site, the honeycomb grating being positioned facing parts to be welded, wherein the inert gas injection device comprises an inert gas diffuser ring mounted coaxially around a periphery of the housing.

2. The gas shielding device according to claim 1, wherein the gas shielding device cooperates with the welding torch and allows welding perpendicular to and on a reverse side of surfaces of the panel to be welded.

3. The gas shielding device according to claim 1, wherein the inert gas diffuser ring provides a non-turbulent feeding of the inert gas onto surfaces of the panel to be welded.

4. The device gas shielding according to claim 1, wherein the inert gas diffuser ring is adapted to diffuse the inert gas indirectly onto the surfaces to be welded, the inert gas diffuser ring comprising gas outlet orifices on its periphery directed towards the concavity of the chamber.

* * * * *